United States Patent Office 3,164,719
Patented Jan. 5, 1965

3,164,719
LUMINESCENT SCREEN HAVING A
PROTECTIVE FILM
Herbert Bauer, Metuchen, N.J., assignor to E. I. du Pont de Nemours and Company, Wilmington, Del., a corporation of Delaware
No Drawing. Filed Oct. 17, 1961, Ser. No. 145,748
7 Claims. (Cl. 250—80)

This invention relates to luminescent screens, and more particularly to X-ray intensifying screens, which have a high degree of resistance to scratching and abrasion and to the action of photographic chemicals, and to processes for making the same.

X-ray intensifying screens usually consist of a stiff cardboard or film support carrying a layer of discrete particles of an X-ray fluorescent material which are uniformly distributed throughout a hard film-forming binding agent, e.g., a cellulose derivative, synthetic resin, superpolymer, etc. The surface of the fluorescent layer is protected by means of a thin layer of a hydrophobic film-forming material which may be cast from a solvent solution or laminated to the surface as an integral preformed film. The function of the protective layer is to prevent physical damage to the active layer containing fluorescent particles. The phosphor layer is very susceptible to scratching and marking, and staining by photographic chemicals with which the screen may come in contact during its normal use. Without a protective layer, the screen would have a very short life. The protective layers of the prior art vary widely in composition and structure and offer varying degrees of protection toward the action of chemicals, abrasion and scratching or other forms of surface marking. Usually these protective coatings or laminated layers are composed fo cellulosic derivatives or synthetic polymers. Generally, layers comprising cellulosic derivatives are somewhat permeable to moisture and are easily stained by contact with photographic processing solutions, e.g. developer solutions. The moisture permeability of the cellulosic layers in time, causes the screen to become so highly stained by photographic developers that the screen loses its efficiency by preventing actinic radiation from reaching the X-ray film. It also interferes with the diagnostic accuracy of radiographs exposed in contact with the stained screens. A disadvantage in the use of synthetic resins of the prior art protective layers is that such layers are quite susceptible to static build-up during normal use. It is obvious to one skilled in the art that such a static build-up can cause a discharge which would cause damaging exposure marks on the developed radiograph.

The above layers, upon prolonged use, also exhibited a tendency toward small surface cracking or "crazing" caused by continued flexing and solvent cleaning. Such defects eventually can cause poor exposure results and interference with diagnostic accuracy.

Recently, improvements have been suggested which comprise using tricomponent mixture of synthetic polymers such as is taught in Patten, U.S. 2,907,882 patented October 6, 1959. In this patent there are disclosed improved X-ray intensifying screens having protective coatings which are highly resistant to abrasive forces, scratching and have improved anti-stain characteristics. The screens also have increased resistance to static charges. The protective layers described in the above patent are composed of an intimate mixture of (1) vinyl chloride vinyl acetate copolymer containing at least 60% by weight of the former, (2) a poly (alkyl acrylate) or poly (alkyl methacrylate) wherein said alkyl radical contains 1 to 2 carbon atoms, and (3) a poly (alkyl acrylate) or poly (alkyl methacrylate) wherein said alkyl group contains 4 to 6 carbon atoms, containing from 50% to 90% of the first component and containing from 45 to 5% by weight of each of the latter components. The preferred mixture is composed of 50% vinyl chloride/vinyl acetate copolymer 25% poly(methyl methacrylate) and 25% poly(isobutylmethacrylate), all percentages by weight.

Layers comprising the latter compositions offer many advantages over the cellulosic and vinyl chloride polymer type layers of the prior art. They substantially eliminate the developer stain problem by being moisture-impermeable. They have a very low degree of susceptibility to static and a very high degree of resistance to abrasion and scratching but do "craze."

An object of this invention is to provide an improved X-ray intensifying screen. Another object is to provide an improved X-ray intensifying screen of superior clarity, long wear and increased resistance to abrasion, scratching and static build-up. A further object is to provide such a screen having a thin flexible layer of phosphor, a thin flexible support and a thin flexible laminated protective layer of good clarity and high resistance to "crazing." A still further object is to provide an X-ray intensifying screen having an improved adhesive layer anchoring the protective layer to the screen support.

The luminescent screens of this invention comprise a support and a layer of luminescent particles dispersed in a coherent, hard film-forming macromolecular polymeric binder bearing a protective film characterized in that the film is a thin, flexible coherent film composed of a vinyl fluoride polymer containing at least 75% by weight of vinyl fluoride, any remaining percentage copolymerizable therewith being a different monoethylenically unsaturated monomer adhesively joined to said layer by a polyester adhesive stratum, said polyester corresponding to the reaction product of a glycol of the formula $HO(CH_2)_nOH$ where $n$ is 2 to 6, terephthalic acid, isophthalic acid and at least one saturated aliphatic dicarboxylic acid of 6–10 carbon atoms, said ester-forming acid components being present in the mol percents of 20 to 60, 15 to 50, and 10 to 50, respectively.

The orientable vinyl fluoride homopolymers and copolymers described in U.S. patents to Bartron 2,953,818 and Coffman et al. 2,419,011 having the intrinsic viscosities and other properties as measured and described therein, e.g., an intrinsic viscosity of at least 1.0 can be used for the protective films of this invention. These films will ordinarily have a thickness from 0.001" to 0.009" and the polyester adhesive layers will be less than 0.001" in thickness.

The luminescent screens of this invention, in addition to the novel protective layer and adhesive layer, may have other auxiliary layers, e.g., a substrata for providing anchorage, pigment layers for reflection and opacifying the clear films, etc. Reflective pigments can be included in the support and where the luminescent particles or phosphors can be included in the adhesive composition which functions both as a binder and an anchoring medium. As reflective pigments, there may be mentioned titanium dioxide, barium sulfate, magnesium carbonate, magnesium oxide or chalk. Colored dyes may also be incorporated in the phosphor layer to absorb light and thereby improving detail. Such dyes are:

Fast Acid Magenta 13, Colour Index 30
Azo Cardinal G, Colour Index 42
Alizarine Yellow 4G, Colour Index 52
Naphthol Orange, Colour Index 150.

The above colour index numbers refer to those in the Society of Dyers and Colourists Colour Index edited by F. M. Rowe, published by the Society, Bradford, Yorkshire, England.

The adhesives which may also act as binders for the active materials may consist of polyesters formed by the reaction of ethylene glycol with a mixture of terephthalic, isophthalic, sebacic and adipic acids as described in Dye, U.S. Patent 2,892,747. Such adhesives may contain a small proportion of one of the polyisocyanates disclosed in Bunge et al., U.S. Patent 2,855,421 as a curing agent. The adhesives may also comprise copolyesters formed by the reaction of ethylene glycol with terephthalic, isophthalic and sebacic acids as disclosed in Example 9 of Alles et al., U.S. Patent 2,698,239. The invention will be further illustrated by but is not intended to be limited to the following examples which are set forth below.

The polyvinyl fluoride films used in preparing the laminations of this invention may be formed by procedures such as those described in U.S. Patent No. 2,953,818 and in U.S. application Serial No. 801,441, filed March 24, 1959, by Robert S. Prengle and Robert L. Richards, Jr. One method of forming such sheets and films comprises feeding a mixture of latent solvent and polyvinyl fluoride to a heated extruder which is connected to a slotted casting hopper. A tough, coalesced extrudate of polyvinyl fluoride is extruded continuously in the form of a sheet or film containing latent solvent. The sheet or film may merely be dried or, alternately, may be heated and stretched in one or more directions while solvent is volatilized therefrom. Sheets and films of polyvinyl fluoride also may be cast from dilute hot solutions of the polymer in latent solvents as described in U.S. Patent Nos. 2,419,008 and 2,419,010.

Even when employing the improved adhesive compositions which are in part the subject of this invention, it is essential that at least the surface of the polyvinyl fluoride film which is to be adhered through the medium of the adhesive interlayer to the substrate be first chemically activated, that is, made receptive by forming in the surface layer thereof functional groups selected from one or more of the class consisting of hydroxyl, carboxyl, carbonyl, amino, amido and ethylenically unsaturated radicals.

Means for activating the surface of polyvinyl fluoride sheets and films include, for example, contacting the surface with gaseous boron trifluoride, aluminum trichloride dissolved in a suitable organic solvent such as nitrobenzene, or titanium tetrachloride or a solution thereof in a suitable organic solvent; liquid compositions comprising either hydrates or organic coordination complexer of boron trifluoride; concentrated or fuming sulfuric acids, sulfur trioxide, hot aqueous sodium hydroxide; contacting one surface with an open flame while cooling the opposite surface or subjecting the film to a high frequency spark discharge in a variety of atmospheres.

In particular, for example, sheets or films of polyvinyl fluoride can be passed through a stainless steel-lined treating chamber containing a gaseous mixture consisting of from about 1% to about 90% by volume of boron trifluoride at a temperature of from about 20° C. to 90° C. Dwell time in the chamber may vary widely depending on both the concentration of boron trifluoride therein and the temperature at which the chamber atmosphere is maintained, but is usually on the order of from about 3 to about 30 seconds. After the treatment with the boron trifluoride, the resulting film may either be washed in aqueous ammonium hydroxide, then in water and finally air dried or merely washed in water and dried or, alternatively, heated for a brief period at a temperature from about 100° C. to 150° C. Another alternate procedure comprises contacting at least one surface of the polyvinyl fluoride film with concentrated or fuming sulfuric acid or sulfur trioxide for from about 2 seconds to about 1 minute, depending on the temperature at which the treatment is carried out. The treated film is washed in water and air dried. Preferably, such acid solutions are held at slightly elevated temperatures, for example from about 25° C. to about 95° C., the higher the temperature employed, the less contact time being required. Still another procedure is to immerse the polyvinyl fluoride sheet or film briefly in a liquid hydrate of boron trifluoride or in a liquid organic coordination complex of boron trifluoride, followed by washing the treated film with water, acetone or ethyl ether, and by air drying. Boron trifluoride coordinates or complexes with a wide variety of organic compounds, particularly amines and oxygen containing compounds such as ethers, alcohols, esters, acids and amides. The complexes of boron trifluoride with dimethyl ether, diethyl ether, methyl ethyl ether and phenol are particularly useful because they are liquids at room temperature. Slightly elevated temperatures are preferably employed to increase the rate of dissociation of the complex, thus shortening the immersion time necessary to effect a satisfactory degree of chemical activation. A still further example of a method for activating the surface of the polyvinyl fluoride film is to pass a sheet or film of polyvinyl fluoride at the rate of from about 50 to about 500 ft./min. over and in contact with a chilled metal drum while the surface not in contact with the drum passes through a flame, for example the flame of a gas burner fueled with a 1:20 propane: air mixture. A still further method for activating a surface of polyvinyl fluoride films is to subject the film to high frequency spark discharge, preferably in an atmosphere of, for example, nitrogen, ammonia, boron trifluoride, oxygen or air. This can be done, for example, by passing a sheet or film of polyvinyl fluoride at a rate of from about 10 to about 300 or more ft./min. over and in contact with a grounded metal drum while the surface away from the drum passes under and in close proximity to (for example, 0.010 to 0.025″) the rod or bar serving as an electrode and connected to a source of high frequency alternating potential.

The surfaces of polyvinyl fluoride sheets or films treated by any of the above-described techniques are known to contain functional groups of the types set forth above.

The following procedure has been found to be satisfactory for the determination of developer stain resistances. A small area of the screen to be tested is wetted with developer solution placed on the protective coating side of the screen. The screen is then placed in a darkened area for 24 hours or until the developer solution has dried. Then the stain left by the developer is washed away with soap and warm water and the screen is dried. A radiograph is made with the screen using 80 KVP and 2 ma. with time of exposure adjusted to give a photographic density of $1.0 \pm 0.1$ in the processed film. The film is examined for any evidence of staining which will appear as an area of light density. Screens coated with cellulose ester protective coatings are visibly stained by these processing solutions. The procedure for measuring "craze" resistance of X-ray intensifying screens is as follows:

A 5″ x 7″ sample screen is mounted with pressure-sensitive adhesive tape on a piece of ½″ thick polyurethane foam which in turn is attached to a 5″ x 7″ aluminum plate of ¼″ thickness. The whole is mounted on a table and made fast by retaining brackets. A movable arm fitted with a rubber suction cup is set up mechanically so that the cup impinges upon the screen surface at an edge of the screen along its short dimension. It is arranged so that the rubber cup depresses the screen-foam composite by ⅜″ on the down stroke. Using a cam device and a numeral counter, repeated depressions of the screen-foam are made possible. At the end of 50,000 cycles the screen is examined under ultraviolet light for "crazing" of the protective coating. Control screens having cellulose ester protective coatings showed 5 to 10% of the surface area of the screen to be "crazed."

The efficiency of a given screen is determined by a comparison of the exposure required using the screen as compared to exposing an X-ray film with no screens. This is customarily expressed in terms of a speed factor which is the $\log_2$ of the density ratio of exposure obtained with a screen versus no screen exposure.

Example I

A sheet of biaxially oriented polyethylene terephthalate film coated on one surface with a substratum of poly (vinylidene chloride co methly methacrylate co itaconic acid) was prepared as described in Alles et al., U.S. Patent 2,698,240. The substratum was coated in turn with a reflective layer 0.0005 inch thick comprising magnesium oxide in a chlorosulfonated polyethylene binder and then with a phosphor layer .007 inch thick comprising fluorescent barium lead sulfate in a polyvinyl butyral binder in the manner described in assignee's Patten et al., application Ser. No. 794,520 filed February 20, 1959, U.S. Patent 3,043,710 July 10, 1962. A sheet of polyvinyl fluoride film 0.0005 inch in thickness and made with its surface activated as described above was then coated with a copolyester adhesive made in the manner described in Example I of Dye, U.S. Patent 2,892,747 and containing as a curing agent a small amount of a 60% methyl isobutyl ketone solution of a diisocyanate of the type described in Bunge et al., U.S. Patent 2,855,421 so that the amount of curing agent is present an amount of about 10% based on the weight of the adhesive. The thickness of the adhesive layer was about 0.0007 inch in thickness. The adhesive coated polyvinyl fluoride film and phosphor coated film were then laminated with the adhesive layer in contact with the phophor layer at a temperature of 60–80° C. and at a pressure of 200 pounds per square inch for 1–2 minutes.

The resulting screen showed remarkable resistance to abrasion and to the formation of small cracks or "crazing" on repeated flexing as described above. The screen also showed complete freedom from staning by photographic developers when tested in the manner described above.

Example II

A screen not having a protective coating was made as described in Example I except that the reflective layer containing the magnesium oxide was omitted. On the phosphor layer there was laminated an aluminized pressure sensitive 0.002 inch polyester film. Such an aluminized film is disclosed and described in British Patent 743,281, now Patent No. 2,958,587.

The resulting film was quite resistant to abrasive wear, "crazing" and to staining by photographic chemicals.

Example III

A phosphor composition was made by thoroughly dispersing X-ray activatable barium lead sulfate in the copolyester adhesive disclosed and described in Example 9 of Alles et al., U.S. Patent 2,698,239 containing a small amount of the diisocyanate curing agent disclosed in Example I. The phosphor composition was applied to a polyester film support containing magnesium oxide reflective coating as disclosed in Example I above. After drying the fluorescent film was laminated at 110° C. and a pressure of 200–250 per square inch to a 0.0005 inch sheet of polyvinyl fluoride film for 1–2 minutes.

The resulting structure showed good adhesion between the two layers, and showed complete freedom from "crazing" and staining by photographic developers.

Example IV

An X-ray intensifying screen was made by coating a polyester film support containing a magnesium oxide reflective coating as described in Example I with a barium lead sulfate fluorescent composition using the polyester adhesive disclosed in Example I as the binder for the phosphor of that example. A protective film of polyvinyl fluoride was laminated to the screen in the manner described in Example III. The resulting screen had good resistance to abrasion, "crazing" and to photographic chemicals.

Example V

Example IV was repeated except that a polyester adhesive comprising the reaction product of ethylene glycol and a mixture of terephthalic and sebacic acids in the ratio of approximately 1:12 and made in the manner described in Snyder U.S. Patents 2,623,031 and 2,623,033. The resulting laminated X-ray intensifying screen had the superior qualities of the screens made by the previous examples.

The screens prepared according to the preceding examples not only showed good resistance to abrasion, "crazing" and to staining by photographic chemicals but they also showed a low degree of susceptibility to static and they were also satisfactory in other properties required of such screens, i.e., flexibility, lack of undesirable color, stability to ultraviolet light, resistance and degradation by radiation, clean ability and lack of brittleness, and they exhibited normal speed and resolving power. In place of the specific adhesives set forth in the foregoing examples, there may be substituted various other polyesters disclosed and described in the various patents made of reference in the examples.

Similarly, screens having other supports and other fluorescent materials as well as other binding agents including cellulose nitrate, the poly (alkyl acrylates) and poly (alkyl methacrylates) or chlorosulfonated polyethylene binding agents, and those described in U.S.P. 2,648,013 can be used and provided with the above-described adhesives and protective films.

In place of the particular fluorescent materials, described in the foregoing examples there may be a substituted equivalent amount of other fluorescent compounds on mixtures of compounds which are suitable fluorescent screens. Additional suitable materials include calcium tungstate, zinc sulfide, zinc silicate, mixed crystals of zinc sulfide and cadmium sulfide, zinc oxide and calcium silicate, zinc phosphate, alkali halides, cadmium sulfide, cadmium selenide, zinc selenide, zinc telluride, cadmium telluride, cadmium tungstate, magnesium fluoride, zinc fluoride, strontium sulfide, thallium activated potassium iodide and sodium iodide.

The structures described herein are useful as luminescent screens of all types but particularly with X-ray intensifying screens and fluoroscopic screens.

The new and improved screens having the adhesives and polyvinyl fluoride protective layers described above are of advantage over previous screen structures in that they are quite resistant to abrasion, cracking or "crazing" due to flexing in normal use. They are also resistant to staining by photographic chemicals, especially developers because the laminated polyvinyl fluoride layer is relatively impermeable to moisture. If the screen comes in contact with photographic developing solution, for example, the solution may be washed away and damaging staining does not result. Another advantage of the new screens is the resistance of the laminated polyvinyl fluoride protective film towards static charge build-up. In each of the foregoing examples, the speed of the screens was not diminished by the application of the adhesive layer and vinyl fluoride polymer film.

The process is also advantageous in that it eliminates the coating and drying steps which are necessary when solutions are used to coat protective layers. The protective films are uniform in thickness and their application has no deleterious effect on the luminescent properties of the layer.

What is claimed is:

1. A luminescent screen comprising a support and a layer of luminescent particles dispersed in a coherent film-forming macromolecular polymer binder bearing a protective film characterized in that the film is a thin, flexible coherent film composed of a vinyl fluoride polymer containing at least 75% by weight of vinyl fluoride, any remaining percentage being a different monoethylenically unsaturated monomer copolymerizable therewith and having an activated surface, which activated surface is adhesively joined to said layer by a stratum of a polyester adhesive, said polyester corresponding to the reaction product of a glycol of the formula $HO(CH_2)_nOH$ where $n$ is 2 to 6, and terephthalic acid, isophthalic acid and at least one saturated aliphatic dicarboxylic acid of 6 to 10 carbon atoms, said latter ester-forming components being present in the mol percents of 20 to 60, 15 to 50, and 10 to 50, respectively.

2. A screen according to claim 1 wherein the film has a thickness from about 0.001 to about 0.009 inch.

3. A screen according to claim 1 wherein the adhesive layer has a thickness from about 0.0001 to about 0.001.

4. A screen according to claim 1 wherein the vinyl fluoride polymer is an orientable homopolymer having an intrinsic viscosity of at least 1.

5. A screen according to claim 1 wherein said binding agent is a polyvinyl butyral.

6. A screen according to claim 1 wherein said binding agent is a polyester as defined in claim 1.

7. A screen according to claim 1 wherein the luminescent particles are fluorescent lead-barium sulfate.

References Cited in the file of this patent

UNITED STATES PATENTS

| | | |
|---|---|---|
| 1,823,278 | Martin | Sept. 15, 1931 |
| 2,341,583 | Tuve | Feb. 15, 1944 |
| 2,689,190 | Hushley | Sept. 14, 1954 |
| 2,716,081 | Marks | Aug. 23, 1955 |
| 2,892,747 | Dye | June 30, 1959 |
| 2,907,882 | Patten | Oct. 6, 1959 |
| 2,941,104 | Swindells | June 14, 1960 |
| 2,953,818 | Bartron | Sept. 27, 1960 |